US010355317B2

(12) United States Patent
Boovaragavan et al.

(10) Patent No.: US 10,355,317 B2
(45) Date of Patent: Jul. 16, 2019

(54) BATTERY CIRCUIT IN SEALED POUCH (71) Applicant: MICROSOFT TECHNOLOGY LICENSING, LLC, Redmond, WA (US)

(72) Inventors: Vijayasekaran Boovaragavan, Cupertino, CA (US); Michael Nikkhoo, Saratoga, CA (US); Dongli Zeng, Fremont, CA (US); John Christopher Collins, San Jose, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 71 days.

(21) Appl. No.: 15/363,961

(22) Filed: Nov. 29, 2016

(65) Prior Publication Data

US 2018/0151918 A1 May 31, 2018

(51) Int. Cl.
*H01M 2/02* (2006.01)
*H01M 2/34* (2006.01)
*H01M 10/04* (2006.01)
*H01M 10/42* (2006.01)
*H01M 10/48* (2006.01)

(52) U.S. Cl.
CPC ....... *H01M 10/425* (2013.01); *H01M 2/0207* (2013.01); *H01M 2/348* (2013.01); *H01M 10/0436* (2013.01); *H01M 10/4257* (2013.01); *H01M 10/48* (2013.01); *H01M 2200/00* (2013.01); *H01M 2220/30* (2013.01)

(58) Field of Classification Search
CPC . H01M 2010/4271; H01M 2010/4278; H01M 10/647; H01M 10/0436
See application file for complete search history.

(56) References Cited

U.S. PATENT DOCUMENTS

| 8,143,847 | B2 | 3/2012 | Kim |
| 8,518,569 | B2 | 8/2013 | Murphy et al. |
| 8,778,529 | B2 | 7/2014 | Seo |
| 9,105,948 | B2 | 8/2015 | Baek |
| 2009/0123821 | A1 | 5/2009 | Kim |
| 2011/0003179 | A1 | 1/2011 | Jang |
| 2011/0008653 | A1 | 1/2011 | Yoon et al. |
| 2013/0230758 | A1 | 9/2013 | Moon et al. |
| 2014/0287280 | A1 | 9/2014 | Kim et al. |
| 2016/0049696 | A1* | 2/2016 | Choi ................ H01M 10/4257 429/61 |

(Continued)

OTHER PUBLICATIONS

Tichy, Robin, "Design Considerations Using Lithium Polymer Batteries", Published on: Aug. 31, 2010 Available at: https://www.wirelessdesignmag.com/article/2010/08/design-considerations-using-lithium-polymer-batteries.

*Primary Examiner* — Matthew J Merkling
(74) *Attorney, Agent, or Firm* — Alleman Hall Creasman & Tuttle LLP (57) ABSTRACT A battery circuit includes a battery cell, monitoring circuitry configured to determine one or more parameters of the battery cell, a pouch enclosing the battery cell and the monitoring circuitry in a sealed, internal cavity, the pouch being configured to inhibit ingress of external fluid to the sealed, internal cavity, and an electrical connector exterior the pouch and electrically connected to the battery cell and the monitoring circuitry via one or more paths extending through the pouch and into the internal cavity.

20 Claims, 4 Drawing Sheets (56) References Cited

U.S. PATENT DOCUMENTS

2016/0111901 A1\* 4/2016 Waterford .......... G01R 31/3606
                                                                320/107
2016/0240892 A1\* 8/2016 Ahn .................... H01M 10/425
2017/0352919 A1\* 12/2017 Ihara ................... H01M 10/052

\* cited by examiner

BATTERY CIRCUIT IN SEALED POUCH

BACKGROUND

Battery cells may be negatively affected from exposure to fluids, such as water. For example, exposure to external fluids may shorten an operational lifespan of a battery cell and/or cause battery cell degradation.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A battery circuit includes a battery cell, monitoring circuitry configured to determine one or more parameters of the battery cell, a pouch enclosing the battery cell and the monitoring circuitry in a sealed, internal cavity, the pouch being configured to inhibit ingress of external fluid to the sealed, internal cavity, and an electrical connector exterior the pouch and electrically connected to the battery cell and the monitoring circuitry via one or more paths extending through the pouch and into the internal cavity.

DETAILED DESCRIPTION

A battery cell typically includes a pair of electrical connection tabs (e.g., a positive tab and a negative tab) that extend from the battery cell to enable the battery to electrically connect with other electronic components of a device. When the battery cell is enclosed in a sealed pouch to prevent exposure of the battery cell to external fluids, the electrical connection tabs may extend through a seam in the pouch to allow the battery cell to electrically connect with other electronic components positioned external to the pouch.

Figure 1:
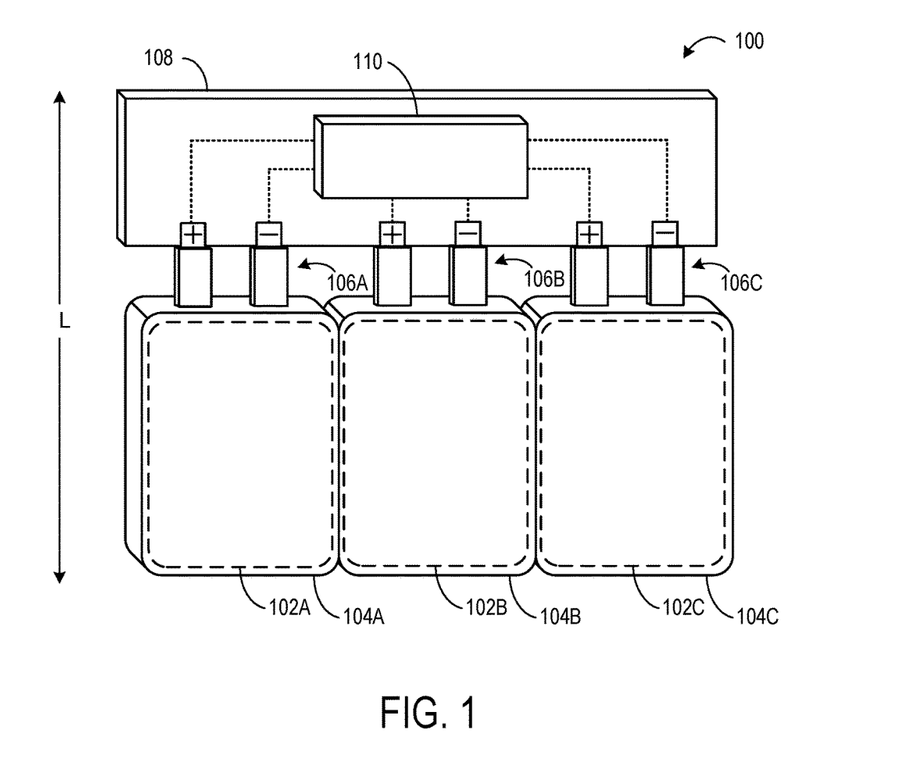
FIG. 1 shows a plurality of battery cells electrically connected to a shared protection circuit module in a multi-cell configuration.
Figure 2:
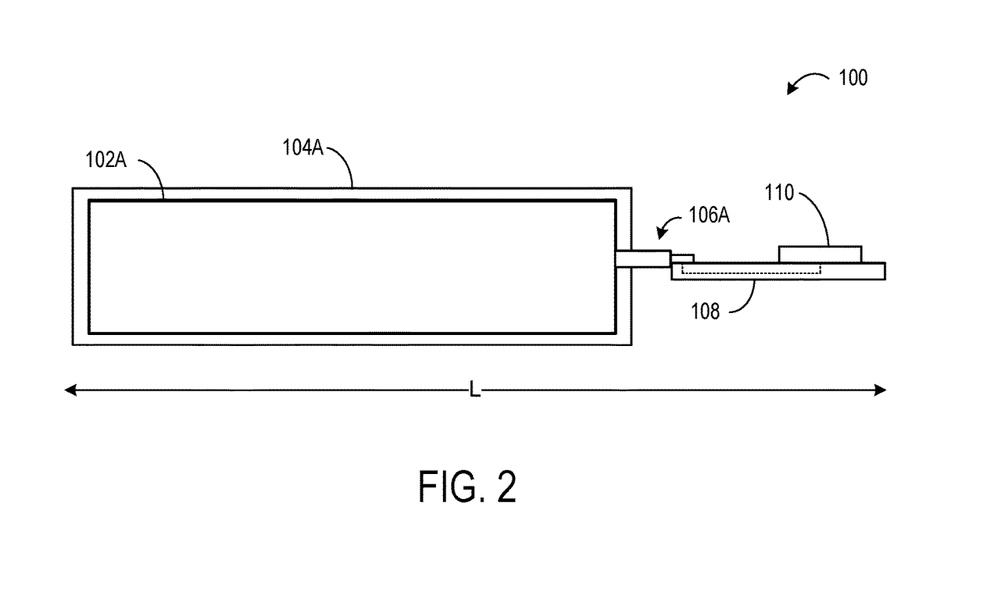
FIG. 2 shows a cross-section view of the battery circuit of FIG. 1.

In one example, FIGS. 1 and 2 show a battery circuit 100 including a plurality of battery cells 102 (e.g., 102A, 102B, 102C). Each battery cell 102 is individually sealed in a separate pouch 104 (e.g., 104A, 104B, 104C) to protect that battery cell 102 from exposure to external fluids. The plurality of battery cells 102 are electrically connected, via individual pairs of electrical connection tabs 106 (e.g., 106A, 106B, 106C), to a printed circuit board (PCB) 108 on which a protection circuit module (PCM) 110 is mounted. The PCM 110 is configured to monitor various operating parameters of each of the plurality of battery cells 102 in order to provide the plurality of battery cells 102 with overcharge/discharge protection, short circuit protection, current limitation, and voltage and current balancing, for example. The PCB 108 is sized and positioned relative to the plurality of battery cells 102 to allow all of the different pairs of electrical connection tabs 106 to electrically connect to the shared PCM 110. In particular, the PCB 108 is positioned adjacent the electrical connection tabs 106 in order to limit an electrical connection length between the battery cells 102 and the PCM 110 (e.g., electrical connection tabs+conductive traces in PCB). However, in such an arrangement the PCB 108 and the PCM 110 are exposed to external fluids. Further, such an arrangement dictates a minimum length (L) the battery circuit 100 can achieve, which further dictates a minimum length of a battery enclosure of a device in which the battery circuit 100 is incorporated. Moreover, such an arrangement does not allow for design flexibility of the battery circuit within the device, because of the fixed spatial relationship between the PCB 108/PCM 110 and the plurality of battery cells 102.

Accordingly, the present description is directed to a battery circuit including a battery cell and monitoring circuitry enclosed in a sealed, internal cavity, of a pouch configured to inhibit ingress of external fluid to the sealed, internal cavity. The battery circuit further includes an electrical connector positioned on an external surface of the pouch. The electrical connector is electrically connected to the battery cell and the monitoring circuitry via one or more paths extending from the electrical connector on the external surface through the pouch and into the internal cavity.

By positioning the monitoring circuitry within the sealed pouch to create an "intelligent sealed pouch," various advantages may be realized relative to a configuration in which a battery cell is electrically connected to an externally-located PCM, such as the configuration shown in FIGS. 1 and 2. As an example, when sealed inside the pouch, the monitoring circuitry is protected from exposure to external fluids. In some implementations, the monitoring circuitry may be further protected from exposure to internal fluids (e.g., battery cell electrolytes) by embedding the monitoring circuitry into the pouch such that the monitoring circuitry may be separated from the battery cell by a layer of pouch material. Furthermore, the electrical connector may be positioned on different faces of the battery cell as desired to accommodate design considerations of a device that incorporates the battery circuit. Further, when the monitoring circuitry is sealed inside the pouch and positioned adjacent a face of the battery cell, as opposed to extending past an end of the battery cell, the overall configuration can have a reduced length relative to the configuration shown in FIGS. 1 and 2, albeit with a slightly greater thickness. In other words, by embedding the monitoring circuitry into the sealed pouch, the battery circuit may be more volumetrically efficient overall. When the battery circuit is a multi-cell configuration, each battery cell may be monitored by separate monitoring circuitry. Such a multi-cell configuration may be more robust, because even if the monitoring circuitry for one battery cell degrades the other battery cells may be protected against power degradation issues. When the monitoring circuitry includes a temperature sensor or a pressure sensor, the temperature sensor or pressure sensor can be located closer to the battery cell and thus may obtain more accurate/relevant temperature or pressure measurements.

FIGS. 3-6 show different example implementations of a battery circuit in which a battery cell and monitoring circuitry are enclosed in a sealed, protective pouch. FIGS. 3A and 3B show a battery circuit 300 including a battery cell 302 and monitoring circuitry 304 configured to determine one or more operating parameters of the battery cell in a protective pouch 306. FIG. 3A shows the pouch 306 unsealed and open to depict how the battery cell 302 and the monitoring circuitry 304 fit within an internal cavity 308 formed by the pouch 306. FIG. 3B shows the pouch 306 enclosing the battery cell 302 and the monitoring circuitry 304 in the sealed, internal cavity 308 to thereby inhibit the ingress of external fluid to the sealed, internal cavity and the components held therein.

Figure 3A:
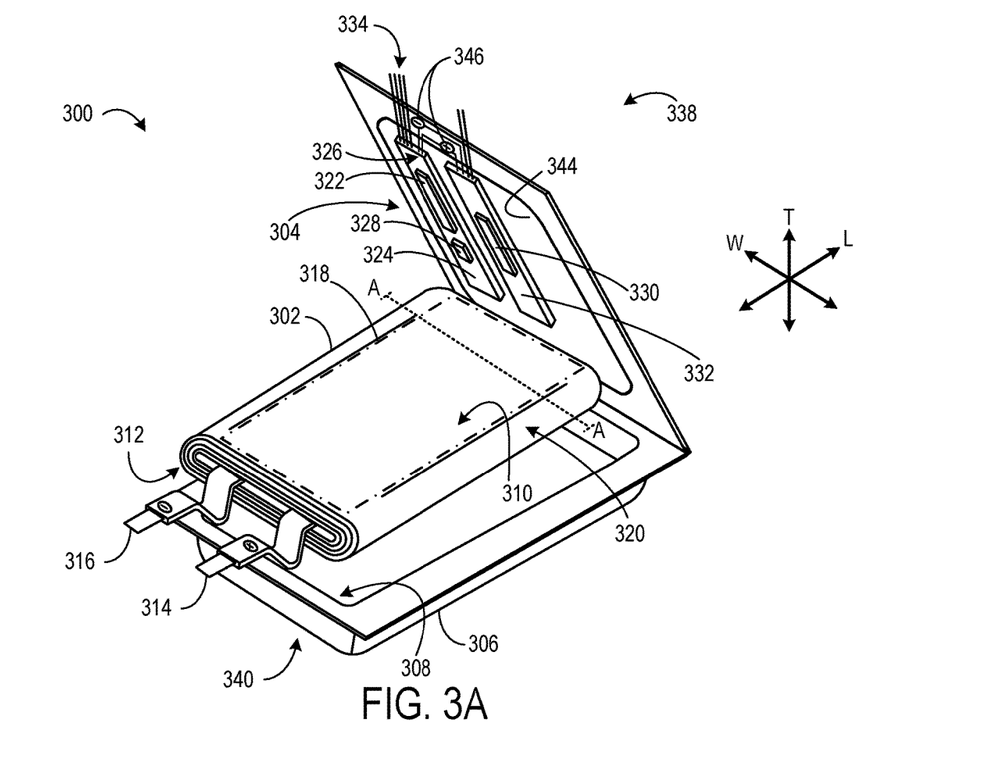
FIG. 3A shows an example battery circuit including a battery cell having external electrical connection tabs placed in an open pouch.

The battery cell 302 is depicted as a jelly roll type Lithium-Ion battery cell. In another example, the battery cell may be a stacked type Lithium-Ion battery cell. The battery cell 302 may take any suitable form and may employ any suitable battery technology.

The battery cell 302 has a flattened cylindrical shape with a rounded rectangular cross section along line A-A. The battery cell 302 defines a plurality a different faces including a side face 310 and an end face 312 transverse to the side face 310. The battery cell 302 includes a positive electrical connection tab 314 and a negative electrical connection tab 316 that extend from the side face 312 of the battery cell 302. The electrical connection tabs 314 and 316 are configured to electrically connect the battery cell 302 to electrical components of the battery circuit 300, as well as other electrical components of a device (e.g., device 336 shown in FIG. 3B) in which the battery circuit 300 is incorporated.

The monitoring circuitry 304 is positioned on an internal surface 344 of an upper portion 338 of the pouch 306. In particular, the monitoring circuitry 304 is positioned such that when the upper portion 338 is folded over on a lower portion 340 when the pouch 306 is sealed, the monitoring circuitry 304 aligns with the side face 310. Further, the monitoring circuitry 304 does not extend beyond a perimeter boundary 318 of the side face 310. In other words, the monitoring circuitry 304 is contained in a two-dimensional footprint of the battery cell 302 (e.g., in the length (L) and width (W) dimensions). In such a configuration, a battery circuit length (e.g., in the length (L) dimension) is reduced while slightly increasing a battery circuit thickness (e.g., in the thickness (T) dimension).

The monitoring circuitry 304 may be positioned on any suitable portion of the pouch 306 to align with any suitable face/end/edge of the battery cell 302 when the pouch 306 is sealed in order to accommodate spatial design requirements of a battery enclosure configured to contain the battery circuit 300. For example, in some implementations, the monitoring circuitry 304 alternatively may be positioned to align with an edge 320 that is perpendicular to the wider side face 310. Moreover, the electrical connection tabs 314 and 316 may be positioned on any suitable face/end/edge of the battery cell 302. For example, in some implementations, the monitoring circuitry 304 may be positioned to align on the same face/end/edge as the electrical connection tabs 314 and 316.

Note that the dimensions for the length (L), width (W), and thickness (T) are provided as an example frame of reference. These dimensions are meant to be non-limiting and do not imply an absolute position and/or orientation of the battery circuit 300.

The monitoring circuitry 304 is configured to monitor various operating parameters of the battery cell 302. In particular, the monitoring circuitry includes a protection circuit module (PCM) 322 configured to monitor one or more electrical parameters (e.g., current, voltage) of the battery cell 302 to provide overcharge/discharge protection, short circuit protection, current limitation, and voltage and current balancing. The PCM 322 is mounted to a first printed circuit board (PCB) 324 configured to electrically connect the PCM 322 to the battery cell 302 via the electrical connection tabs 314 and 316. In particular, conductive (e.g., copper) traces 326 are coupled to the internal surface 344 of the upper portion 338 of the pouch 306 and run between the first PCB 324 and electrical contacts 346 configured to couple with the electrical connection tabs 314 and 316 when the pouch 306 is sealed to provide an electrical connection to the PCM 322. The first PCB 324 may take any suitable form. In one example, the first PCB 324 is a flexible substrate.

The first PCB 324 may act as a physical and electrical mounting platform for additional integrated circuits. In some implementations, a wireless communication circuit 328 may be mounted on the first PCB 324 and electrically connected to the battery cell 302. Non-limiting examples of the wireless communication circuit 328 may include a Wi-Fi transceiver and a Bluetooth transceiver. The wireless communication circuit 328 may be susceptible to desense (i.e., signal sensitivity degradation) due to noise sources of the device in which the wireless communication circuit 328 is incorporated. By positioning the wireless communication circuit 328 in the sealed pouch 306, the wireless communication circuit 328 may be shielded from such noise sources and may be less susceptible to desense.

Any suitable integrated circuit may be mounted on the first PCB 324, electrically connected to the battery cell 302, and enclosed in the internal cavity 308 of the pouch 306. For example, the first PCB 324 may accommodate other integrated circuits (ICs), system on a chip (SOCs), and other processors.

Furthermore, the monitoring circuitry 304 may include a temperature circuit 330 configured to monitor a temperature of the battery cell. In one example, the temperature circuit 330 includes a thermal cutoff (TCO) circuit configured to interrupt electric current between the battery cell 302 and other electronic components in response to a temperature of the battery cell 302 exceeding a threshold temperature. The temperature circuit 330 is mounted to a second PCB 332 configured to electrically connect the temperature circuit 330 to the battery cell 302 via the electrical connection tabs 314 and 316. In particular, conductive (e.g., copper) traces 326 are coupled to the internal surface 344 of the upper portion 338 of the pouch 306 and run between the temperature circuit 330 and electrical contacts 346 configured to couple with the electrical connection tabs 314 and 316 when the pouch 306 is sealed to provide an electrical connection to the temperature circuit 330. By positioning the temperature circuit 330 in the sealed pouch 306, a distance between the temperature circuit 330 and the battery cell 302 may be reduced. Such a reduction in distance increases an accuracy of the temperature measurement performed by the temperature circuit 330. In some implementations, a pressure circuit may be mounted on the second PCB 332 and electrically connected to the battery 302 in addition to or instead of the temperature circuit 330.

In the depicted implementation, the PCM 322 and the temperature circuit 330 are mounted on separate PCBs. Such a configuration may be due to these electrical components being separate "off-the-shelf" components. In other implementations, the PCM 322, the temperature circuit 330, and/or other ICs may be mounted on the same PCB that is electrically connected to battery cell 302 via the electrical connection tabs 314 and 316.

Figure 3B:
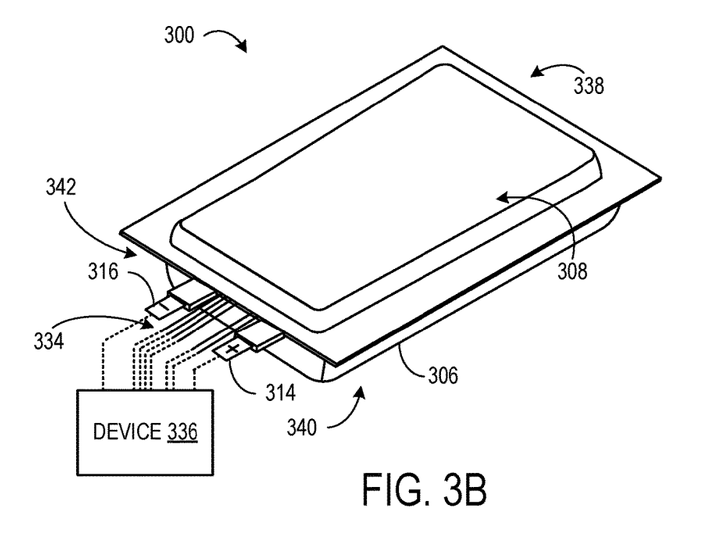
FIG. 3B shows the battery circuit of FIG. 3A sealed in the pouch with external electrical connection tabs electrically connecting the battery circuit to a device.

The monitoring circuitry 304 may be electrically connected to external electrical components of the device 336 in which the battery circuit is incorporated via external signal lines 334. For example, the external signal lines 334 may provide determined operating parameters (e.g., current, voltage, temperature) and other battery cell information to external components of the device 336, such as a CPU or control logic.

The monitoring circuitry 304, conductive traces 326, and external signal lines 334 may be coupled to the internal surface 344 of the upper portion 338 of the pouch 306 in any suitable manner. For example, such electrical components may be coupled to the pouch 306 via adhesive tape.

The pouch 306 may be a singular piece that is folded over to create the upper portion 338 and the lower portion 340. The internal cavity 308 may be formed by the upper portion 338 folding onto the lower portion 340. The pouch 306 may include any suitable material configured to inhibit the ingress of fluids into the internal cavity 308. In one example, the pouch 306 includes aluminum. In another example, the pouch 306 includes a multi-layered structure including an aluminum core layer, an adhesive seal layer formed on an external surface of the aluminum core layer, and an internal insulation layer formed on internal surface of the aluminum core layer. In one example, the pouch material is approximately 120 microns thick. In the depicted implementation, the monitoring circuitry 304 is positioned on the pouch 306 within the internal cavity 308 such that the monitory circuitry 304 is exposed to the battery cell 302. In some implementations, the monitoring circuitry 304 may be embedded into the pouch 306 such that the monitoring circuitry 304 is separated from the battery cell 302. For example, the pouch 306 may include a plurality of layers and the monitoring circuitry 304 may be sealed between two layers such that a layer of the pouch 306 separates the monitoring circuitry 304 from the battery cell 302. In such an implementation, conductive traces may extend through one or more layers of the pouch 306 to electrically connect the monitoring circuitry 304 and the battery cell 302. In such an implementation, the pouch 306 inhibits the monitoring circuitry 304 from being exposed to external fluids as well as internal fluids (e.g., battery cell electrolytes).

FIG. 3B shows that the pouch 306 is sealed to enclose the battery cell 302, the monitoring circuitry 304, and the other components in the internal cavity 308 to thereby inhibit these components from exposure to external fluids. The pouch 306 may be sealed in any suitable manner. For example, edges of the upper portion 338 and edges of the lower portion 340 may be sealed to one another via vacuum procedures, heat procedures, adhesives, and/or any other suitable sealing process/mechanism. When the pouch 306 is sealed, the electrical connection tabs 314 and 316, as well as the external signal lines 334 are positioned to extend through a seem 342 formed between the upper portion 338 and the lower portion 340 of the pouch 306. In other words, when the pouch 306 is sealed these connections are externally exposed to allow the battery circuit 300 to be connected to the electrical components of the device 336. In this way, the battery circuit 300 can provide electrical power to the device 336.

The device 336 may take any suitable form. Non-limiting examples of the device 336 include a mobile computing device (e.g., a smartphone, a tablet), a head-mounted device (e.g., a virtual-reality device, augmented-reality device), a wearable health-monitoring device, a laptop computer, a desktop computer, and a game console. Moreover, the battery circuit 300 may be connected to the device 336 using any suitable type of mechanical and/or electrical connectors.

Figure 4A:
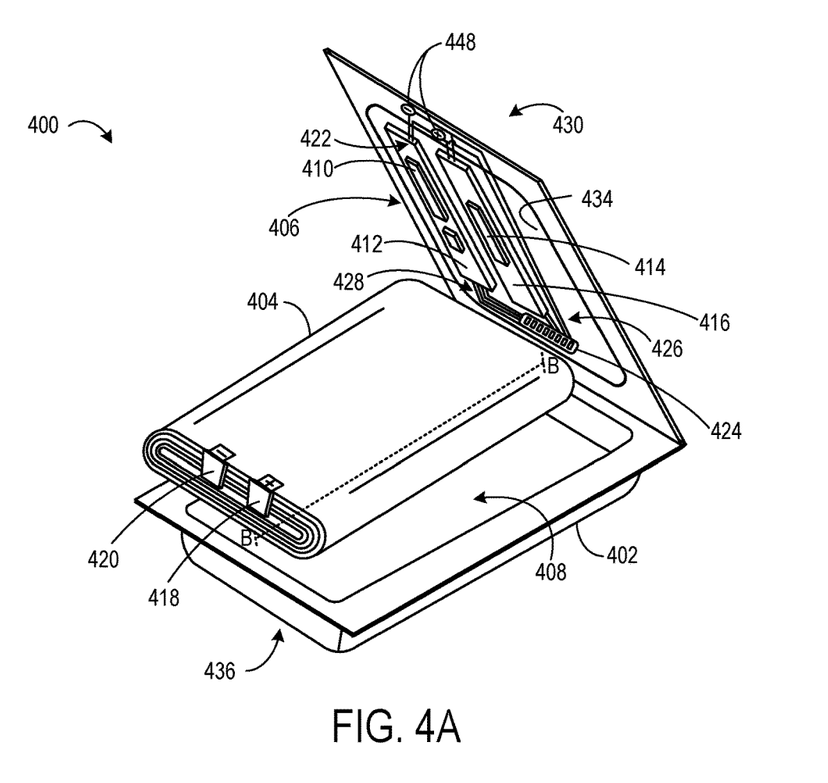
FIG. 4A shows an example battery circuit including a battery cell electrically connected to an external multi-pin connector and placed in an open pouch.
Figure 4B:
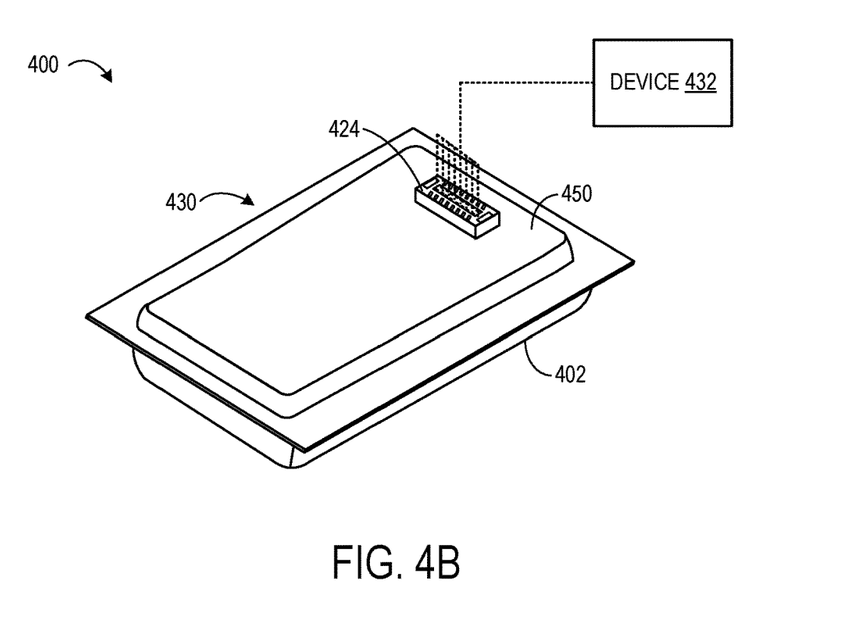
FIG. 4B shows the example battery circuit of FIG. 4A sealed in the pouch with an external multi-pin connector electrically connecting the battery circuit to a device.

FIGS. 4A and 4B show an example battery circuit 400 that includes a multi-pin connector 424 configured to electrically connect the battery circuit 400 to a device 432. FIG. 4A shows a pouch 402 unsealed and open to depict how a battery cell 404 and monitoring circuitry 406 electrically connect to the multi-pin connector 424. FIG. 4B shows the pouch 402 enclosing the battery cell 404 and the monitoring circuitry 406 in a sealed, internal cavity 408 such that the multi-pin connector 424 acts as an interface between the battery components and a device 432. Components of the battery circuit 400 that may be substantially the same as those of the battery circuit 300 are described no further.

The monitoring circuitry 406 is positioned on an internal surface 434 of an upper portion 430 of the pouch 402. In particular, the monitoring circuitry 406 is positioned such that when the upper portion 430 is folded over on a lower portion 436 when the pouch 402 is sealed, the monitoring circuitry 406 aligns with the battery cell 404. The monitoring circuitry 406 includes a PCM 410 mounted on a first PCB 412 and a temperature circuit 414 mounted on a second PCB 416. The PCBs 412 and 416 are electrically connected to a positive electrical connection tab 418 and a negative electrical connection tab 420 of the battery cell 404 via conductive traces 422. In particular, the conductive traces 422 run along the internal surface 434 of the upper portion 430 of the pouch 402 and connect with electrical contacts 448 configured to couple with the electrical connection tabs 418 and 420 when the pouch 402 is sealed. Accordingly, the PCM 410 and the temperature circuit 414 can monitor operating parameters of the battery cell 404 and provide various protective measures for the battery cell 404.

In this implementation, the electrical connection tabs 418 and 420 are folded over onto the battery cell 404 such that the electrical connection tabs 418 and 420 are not externally exposed when the pouch 402 is sealed. Instead, a multi-pin connector 424 acts as an external interface to connect the battery circuit 400 with the device 432. In particular, power line traces 426 connect the multi-pin connector 424 to the electrical connection tabs 418 and 420 via the electrical contacts 448. Further, signal lines 428 connect the monitoring circuitry 406 to the multi-pin connector 424. For example, the signal lines 428 may provide determined operating parameters (e.g., current, voltage, temperature) and other battery cell information to external components of the device 432 via the multi-pin connector 424. In one example, the power line traces 426 and the signal lines 428 are copper wires. However, the power line traces 426 and the signal lines 428 may include any suitable conductive material.

The multi-pin connector 424 is positioned on an external surface 450 of an upper portion 430 of the pouch 402. The multi-pin connector 424 extends from the external surface 450 of the upper portion 430, through the pouch 402, and into the internal cavity 408. The multi-pin connector 424 and the pouch 402 may be cooperatively configured so that the internal cavity 408 remains sealed. For example, an external portion and an internal portion of the multi-pin connector 424 may be pinched together to sandwich the pouch 402 between the two portions to create a seal. Such a configuration of the multi-pin connector is discussed in further detail below with reference to FIG. 5.

The multi-pin connector 424 may connect with any suitable electrical components of the device 432 to electrically connect the battery circuit 400 to the device 432. The multi-pin connector 424 may take any suitable form. For example, the multi-pin connector 424 may include any suitable number of pins corresponding to any suitable number of power lines, signal lines, and other electrical connections.

The multi-pin connector 424 may have any suitable orientation and/or position on any suitable external surface/side/edge/face of the pouch 402 as desired to accommodate design considerations of the battery circuit 400 and/or the device 432. For example, the multi-pin connector 424 may be positioned on a side face of the battery cell 404 such that the multi-pin connector 424 does not extend beyond a perimeter boundary of the side face. In other words, the multi-pin connector 424 may be contained in a two-dimensional footprint of the battery cell 404 in order to limit an overall length of the battery circuit 400.

Figure 5:
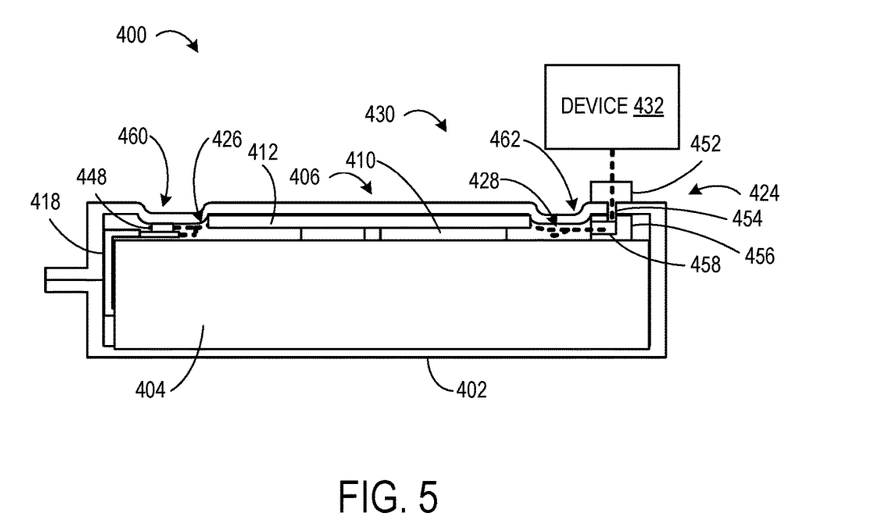
FIG. 5 shows a cross-section view of the battery circuit of FIG. 4.

FIG. 5 shows a cross-section view of the battery circuit 400 of FIG. 4 along line B-B but with the jelly-roll battery cell 404 depicted as a solid block for simplicity. The depicted view highlights how the multi-pin connector 424 passes through the pouch 402. In particular, the multi-pin connector 424 includes an external portion 452 including electrical contacts 454 that pass through the upper portion 430 of the pouch 402. Further, the multi-pin connector 424 includes an internal portion 456 including connectors 458 that electrically couple to the power line traces 426 and the signal lines 428. The external portion 452 and the internal portion 456 may be coupled (e.g., pressed) together such that the electrical contacts 454 contact the connectors 458 to make an electrical connection. Further, when pressed together, the external portion 452 and the internal portion 458 may collectively form a seal around the holes in the pouch 402 through which the electrical contacts 454 extend to keep the internal cavity 408 sealed from external exposure.

Furthermore, during the sealing process, the pouch 402 may be shrink-wrapped around the battery cell 404 and components in the internal cavity 408. Such shrink-wrapping may exert pressure that causes the conductive traces to electrically connect with the electrical contacts 448 and the other various electrical components. In particular, the sealing process creates a first depression 460 in the pouch 402 that causes the power line traces 426 to electrically connect with the electrical connection tabs 418 and 420. Further, the sealing process creates a second depression 462 in the pouch 402 that causes the signal lines 428 to electrically connect with the connectors 458.

The electrical connection tabs 418 and 420 and the PCBS 412 and 416 may be secured to the internal surface 434 of the pouch 402 in a fixed position in any suitable manner. In one example, the components may be fixed to the pouch 402 via a heat-proof adhesive.

In some implementations, conductive ink traces may be printed on the internal surface (and/or the external surface) of the pouch 402 to electrically connect the battery cell 404, the monitoring circuitry 406, the multi-pin connector 424, and/or other electrical components of the battery circuit 400. The conductive ink traces may be applied to the internal surface 434 of the pouch 402 in any suitable manner. In some implementations, a combination of conductive traces and conductive ink may be used to electrically connect various electrical components of the battery circuit 400. In some implementations, the electrical connection tabs 418 and 420, the PCBs 412 and 416, the connectors 458 of the multi-pin connector 424, and any other electronic components in the internal cavity may have enlarged contacts to increase the likelihood of an electrical connection with the conductive ink traces. Moreover, in some implementations, additional conductive adhesive material may be used to secure the connection between the contacts of the various electrical components and the conductive ink traces.

In some implementations, conductive ink, traces, wires or other electrical connections may be embedded in the pouch 402. In one example, the pouch 402 includes a plurality of layers, and the conductive traces are sandwiched between two layers of the pouch 402.

Figure 6:
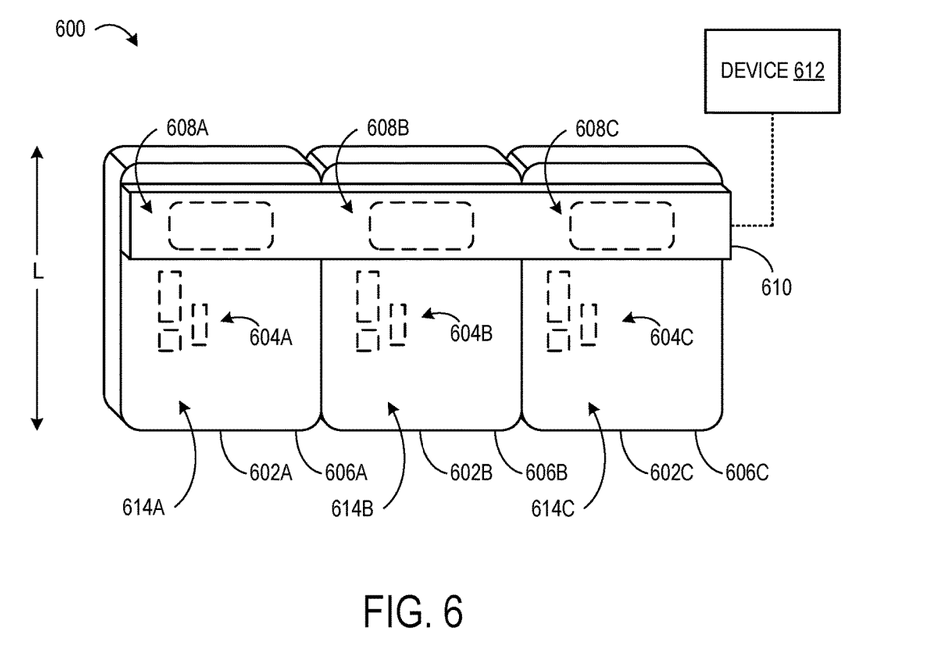
FIG. 6 shows multi-cell battery circuit including a plurality of battery cells having individual monitoring circuitry.

FIG. 6 shows a multi-cell battery circuit 600 including a plurality of battery cells 602 having individual monitoring circuitry 604. The battery circuit 600 includes a plurality of battery cells 602 (e.g., 602A, 602B, 602C). Each battery cell 602 is monitored by monitoring circuitry 604 (e.g., 604A, 604B, 604C) that is electrically connected to the corresponding battery cell 602. Each battery cell 602 and corresponding monitoring circuitry 604 are sealed in a pouch 606 (e.g., 606A, 606B, 606C) to protect that battery cell 602 and the monitoring circuitry 604 from exposure to external fluids. Further, each battery cell 602 includes an external connector 608 (e.g., 608A, 608B, 608C) that is electrically connected to the battery cell 602 and the monitoring circuitry 604. The external connector 608 provides an external interface that enables the battery cell 602 and the monitoring circuitry 604 to electrically connect with a device 612 in which the battery circuit 600 is incorporated. In particular, the plurality of electrical connectors 608 electrically connect with a PCB 610 that is further electrically connected to the device 612. Each external connector 608 is positioned on a side face 614 (e.g., 614A, 614B, 614C) of the battery cell 602 such that the external connector 608 does not extend beyond a perimeter boundary of the side face 614. Moreover, the PCB 610 does not extend beyond a collective perimeter boundary of the plurality of side faces 614.

In such a configuration, with equivalently sized battery cells a length (L) of the battery circuit 600 may be less than a length of the battery circuit 100 shown in FIGS. 1 and 2. Further, because each battery cell 602 has separate monitoring circuitry 604 that is positioned inside the protective pouch 606, there is design flexibility in the positioning of the external connector 608. In other words, because the monitoring circuitry 604 does not have to connect to all of the battery cells 602 of the battery circuit 600, the external connector 608 can be positioned as desired to accommodate spatial requirements of the design of the multi-cell battery circuit 600. Moreover, because each battery cell is monitored by separate monitoring circuitry, the battery circuit 600 maybe more robust relative to the battery circuit 100 that uses a single PCM 110 to monitor all of the battery cells 102 of the battery circuit 100.

In an example, a battery circuit comprises a battery cell, monitoring circuitry configured to determine one or more parameters of the battery cell, a pouch enclosing the battery cell and the monitoring circuitry in a sealed, internal cavity, the pouch being configured to inhibit ingress of external fluid to the sealed, internal cavity, and an electrical connector exterior the pouch and electrically connected to the battery cell and the monitoring circuitry via one or more traces extending through the pouch and into the internal cavity. In this example and/or other examples, the monitoring circuitry may include a protection circuit module configured to monitor one or more electrical parameters of the battery cell. In this example and/or other examples, the monitoring circuitry may include a temperature circuit configured to monitor a temperature of the battery cell. In this example and/or other examples, the battery circuit may further comprise a wireless communication circuit enclosed in the sealed, internal cavity and electrically connected to the battery cell. In this example and/or other examples, the monitoring circuitry may be electrically connected to the battery cell via one or more conductive traces. In this example and/or other examples, the monitoring circuitry may be electrically connected to the battery cell via conductive ink printed on an interior surface of the pouch. In this example and/or other examples, the battery circuit may further comprise a circuit board electrically connected to one or more electrical connection tabs extending from the battery cell, the monitoring circuitry may be mounted on the circuit board to electrically connect the monitoring circuitry to the battery cell, and the circuit board may be enclosed in the sealed, internal cavity formed by the pouch. In this example and/or other examples, the electrical connector may include one or more electrical connection tabs extending from the battery cell. In this example and/or other examples, the electrical connector may include a multi-pin connector electrically connected to the battery cell via one or more electrical connection tabs extending from the battery cell. In this example and/or other examples, the battery cell may define a first face and a second face different than the first face, the monitoring circuitry and the electrical connector may be positioned to align with the first face such that the monitoring circuitry and the electrical connector do not extend beyond a perimeter boundary of the first face, the battery cell may include one or more electrical connection tabs extending from the second face, the one or more electrical connection tabs configured to electrically connect the battery cell with the monitoring circuitry and the electrical connector.

In an example, a battery circuit comprises a battery cell having a face, monitoring circuitry positioned to align with the face of the battery cell such that the monitoring circuitry does not extend beyond a perimeter boundary of the face, the monitoring circuitry configured to determine one or more parameters of the battery cell, a pouch enclosing the battery cell and the monitoring circuitry in a sealed, internal cavity, the pouch being configured to inhibit ingress of external fluid to the sealed, internal cavity, and an electrical connector exterior the pouch and electrically connected to the battery cell and the monitoring circuitry via one or more conductive traces extending through the pouch and into the internal cavity. In this example and/or other examples, the face may be a first face, and the battery cell may include one or more electrical connection tabs extending from a second face different than the first face, the one or more electrical connection tabs configured to electrically connect the battery cell with the electrical connector and the monitoring circuitry. In this example and/or other examples, the monitoring circuitry may include a protection circuit module configured to monitor one or more electrical parameters of the battery cell. In this example and/or other examples, the monitoring circuitry may include a temperature circuit configured to monitor a temperature of the battery cell. In this example and/or other examples, the monitoring circuitry may be electrically connected to the battery cell via conductive ink printed on an interior surface of the pouch. In this example and/or other examples, the battery circuit may further comprise a circuit board electrically connected to one or more electrical connection tabs extending from the battery cell, the monitoring circuitry may be mounted on the circuit board to electrically connect the monitoring circuitry to the battery cell, and the circuit board may be enclosed in the sealed, internal cavity formed by the pouch. In this example and/or other examples, the electrical connector may include a multi-pin connector electrically connected to the battery cell via one or more electrical connection tabs extending from the battery cell.

In an example, a mobile computing device comprises a battery circuit comprising, a battery cell, a protection circuit module configured to monitor one or more electrical parameters of the battery cell, a temperature circuit configured to monitor a temperature of the battery cell, a pouch enclosing the battery cell, the protection circuit module, and the temperature circuit in a sealed, internal cavity, the pouch being configured to inhibit ingress of external fluid to the sealed, internal cavity, and an electrical connector exterior the pouch and electrically connected to the battery cell, the protection circuit module, and the temperature circuit via one or more paths extending through the pouch and into the internal cavity. In this example and/or other examples, the battery cell may define a first face and a second face different than the first face, the protection circuit module, the temperature circuit and the electrical connector may be positioned to align with the first face such that the protection circuit module, the temperature circuit, and the electrical connector do not extend beyond a perimeter boundary of the first face, and wherein the battery cell includes one or more electrical connection tabs extending from the second face, the one or more electrical connection tabs configured to electrically connect the battery cell with the protection circuit module, the temperature circuit, and the electrical connector. In this example and/or other examples, the battery circuit may further comprise a circuit board electrically connected to the one or more electrical connection tabs, the protection circuit module, the temperature circuit, and the electrical connector may be mounted on the circuit board to electrically connect the monitoring circuitry to the battery cell, and the circuit board may be enclosed in the sealed, internal cavity formed by the pouch.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A battery circuit comprising:
   a battery cell;
   monitoring circuitry configured to determine one or more parameters of the battery cell;
   a pouch enclosing the battery cell and the monitoring circuitry in a sealed, internal cavity, such that the battery cell and the monitoring circuitry remain unsealed from one another, and the pouch being configured to inhibit ingress of external fluid to the sealed, internal cavity; and an electrical connector exterior the pouch and electrically connected to the battery cell and the monitoring circuitry via one or more traces extending through the pouch and into the internal cavity.

2. The battery circuit of claim 1, wherein the monitoring circuitry includes a protection circuit module configured to monitor one or more electrical parameters of the battery cell.

3. The battery circuit of claim 1, wherein the monitoring circuitry includes a temperature circuit configured to monitor a temperature of the battery cell.

4. The battery circuit of claim 1, further comprising:
a wireless communication circuit enclosed in the sealed, internal cavity and electrically connected to the battery cell.

5. The battery circuit of claim 1, wherein the monitoring circuitry is electrically connected to the battery cell via one or more conductive traces.

6. The battery circuit of claim 1, wherein the monitoring circuitry is electrically connected to the battery cell via conductive ink printed on an interior surface of the pouch.

7. The battery circuit of claim 1, further comprising:
a circuit board electrically connected to one or more electrical connection tabs extending from the battery cell, wherein the monitoring circuitry is mounted on the circuit board to electrically connect the monitoring circuitry to the battery cell, and wherein the circuit board is enclosed in the sealed, internal cavity formed by the pouch.

8. The battery circuit of claim 1, wherein the electrical connector includes one or more electrical connection tabs extending from the battery cell.

9. The battery circuit of claim 1, wherein the electrical connector includes a multi-pin connector electrically connected to the battery cell via one or more electrical connection tabs extending from the battery cell.

10. The battery circuit of claim 1, wherein the battery cell defines a first face and a second face different than the first face, wherein the monitoring circuitry and the electrical connector are positioned to align with the first face such that the monitoring circuitry and the electrical connector do not extend beyond a perimeter boundary of the first face, and wherein the battery cell includes one or more electrical connection tabs extending from the second face, the one or more electrical connection tabs configured to electrically connect the battery cell with the monitoring circuitry and the electrical connector.

11. A battery circuit comprising:
a battery cell having a face;
monitoring circuitry positioned to align with the face of the battery cell such that the monitoring circuitry does not extend beyond a perimeter boundary of the face, the monitoring circuitry configured to determine one or more parameters of the battery cell;
a pouch enclosing the battery cell and the monitoring circuitry in a sealed, internal cavity, such that the battery cell and the monitoring circuitry remain unsealed from one another, and the pouch being configured to inhibit ingress of external fluid to the sealed, internal cavity; and
an electrical connector exterior the pouch and electrically connected to the battery cell and the monitoring circuitry via one or more conductive traces extending through the pouch and into the internal cavity.

12. The battery circuit of claim 11, wherein the face is a first face, and wherein the battery cell includes one or more electrical connection tabs extending from a second face different than the first face, the one or more electrical connection tabs configured to electrically connect the battery cell with the electrical connector and the monitoring circuitry.

13. The battery circuit of claim 11, wherein the monitoring circuitry includes a protection circuit module configured to monitor one or more electrical parameters of the battery cell.

14. The battery circuit of claim 11, wherein the monitoring circuitry includes a temperature circuit configured to monitor a temperature of the battery cell.

15. The battery circuit of claim 11, wherein the monitoring circuitry is electrically connected to the battery cell via conductive ink printed on an interior surface of the pouch.

16. The battery circuit of claim 11, further comprising a circuit board electrically connected to one or more electrical connection tabs extending from the battery cell, wherein the monitoring circuitry is mounted on the circuit board to electrically connect the monitoring circuitry to the battery cell, and wherein the circuit board is enclosed in the sealed, internal cavity formed by the pouch.

17. The battery circuit of claim 11, wherein the electrical connector includes a multi-pin connector electrically connected to the battery cell via one or more electrical connection tabs extending from the battery cell.

18. A mobile computing device comprising:
a battery circuit comprising:
a battery cell;
a protection circuit module configured to monitor one or more electrical parameters of the battery cell;
a temperature circuit configured to monitor a temperature of the battery cell;
a pouch enclosing the battery cell, the protection circuit module, and the temperature circuit in a sealed, internal cavity, such that the battery cell, the protection circuit module, and the temperature circuit remain unsealed from one another, and the pouch being configured to inhibit ingress of external fluid to the sealed, internal cavity; and
an electrical connector exterior the pouch and electrically connected to the battery cell, the protection circuit module, and the temperature circuit via one or more paths extending through the pouch and into the internal cavity.

19. The mobile computing device of claim 18, wherein the battery cell defines a first face and a second face different than the first face, wherein the protection circuit module, the temperature circuit, and the electrical connector are positioned to align with the first face such that the protection circuit module, the temperature circuit, and the electrical connector do not extend beyond a perimeter boundary of the first face, and wherein the battery cell includes one or more electrical connection tabs extending from the second face, the one or more electrical connection tabs configured to electrically connect the battery cell with the protection circuit module, the temperature circuit, and the electrical connector.

20. The mobile computing device of claim 19, wherein the battery circuit further comprises a circuit board electrically connected to the one or more electrical connection tabs, wherein the protection circuit module, the temperature circuit, and the electrical connector are mounted on the circuit board to electrically connect the monitoring circuitry to the battery cell, and wherein the circuit board is enclosed in the sealed, internal cavity formed by the pouch.

* * * * *